United States Patent
Baikov et al.

(10) Patent No.: US 9,454,616 B2
(45) Date of Patent: *Sep. 27, 2016

(54) METHOD AND SYSTEM FOR UNIFYING CONFIGURATION DESCRIPTORS

(75) Inventors: Chavdar S. Baikov, Sofia (BG);
Dimitar Angelov, Montana (BG);
Vladimir Savchenko, Sofia (BG);
Alexander Zubev, Pazardjik (BG);
Dimitrina Stoyanova, Elhovo (BG)

(73) Assignee: SAP SE, Walldorf (DE)

( * ) Notice: Subject to any disclaimer, the term of this patent is extended or adjusted under 35 U.S.C. 154(b) by 952 days.

This patent is subject to a terminal disclaimer.

(21) Appl. No.: 11/238,244

(22) Filed: Sep. 28, 2005

(65) Prior Publication Data
US 2007/0073849 A1   Mar. 29, 2007

(51) Int. Cl.
*G06F 17/30* (2006.01)
*G06F 9/54* (2006.01)
*H04L 29/08* (2006.01)

(52) U.S. Cl.
CPC ........... *G06F 17/3089* (2013.01); *G06F 9/54* (2013.01); *H04L 67/025* (2013.01)

(58) Field of Classification Search
CPC ...... G06F 17/3089; G06F 8/30; G06F 9/541; G06F 8/65; G06F 17/2247; H04L 67/10; H04L 67/02
USPC .................................................. 709/220–222
See application file for complete search history.

(56) References Cited

U.S. PATENT DOCUMENTS

| | | | |
|---|---|---|---|
| 6,202,207 | B1 | 3/2001 | Donohue |
| 6,604,113 | B1 | 8/2003 | Kenyon et al. |
| 6,954,792 | B2 | 10/2005 | Kang et al. |
| 7,159,224 | B2 | 1/2007 | Sharma et al. |
| 7,184,922 | B2 | 2/2007 | Ousley et al. |
| 7,231,435 | B2 | 6/2007 | Ohta |
| 7,277,935 | B2 | 10/2007 | Sato |
| 7,284,039 | B2 | 10/2007 | Berkland et al. |
| 7,366,717 | B2 | 4/2008 | Warshavsky et al. |
| 7,373,661 | B2 | 5/2008 | Smith et al. |
| 7,376,959 | B2 | 5/2008 | Warshavsky et al. |
| 7,409,709 | B2 | 8/2008 | Smith et al. |
| 7,421,495 | B2 | 9/2008 | Yang et al. |
| 7,467,162 | B2 | 12/2008 | Rosenbloom et al. |
| 7,617,480 | B2 | 11/2009 | Falter et al. |
| 7,640,348 | B2 | 12/2009 | Atwal et al. |

(Continued)

FOREIGN PATENT DOCUMENTS

| EP | 1318461 A1 * | 6/2003 | ............. G06F 17/30 |
|---|---|---|---|
| EP | 1387262 A1 | 2/2004 | |

(Continued)

OTHER PUBLICATIONS

Final Office Action for U.S. Appl. No. 10/749,666 Mailed Nov. 24, 2008, 15 pages.

(Continued)

*Primary Examiner* — Jackie Zuniga Abad
(74) *Attorney, Agent, or Firm* — Schwegman Lundberg & Woessner, P.A.

(57) ABSTRACT

A method and system for unifying configuration files. In one embodiment, a web services configuration file and a web services client configuration file are identified. The web services and web services client configuration files are unified to create a configuration file.

20 Claims, 8 Drawing Sheets

(56) References Cited

U.S. PATENT DOCUMENTS

| | | | |
|---|---|---|---|
| 7,673,282 B2 | 3/2010 | Amaru et al. |
| 7,693,955 B2 | 4/2010 | Karakashian |
| 7,698,684 B2 | 4/2010 | Baikov |
| 7,831,693 B2 | 11/2010 | Lai |
| 7,877,725 B2 | 1/2011 | Vitanov et al. |
| 7,877,726 B2 | 1/2011 | Sabbouh |
| 7,945,893 B2 | 5/2011 | Angrish et al. |
| 8,099,709 B2 | 1/2012 | Baikov |
| 8,108,830 B2 | 1/2012 | Bibr et al. |
| 8,250,522 B2 | 8/2012 | Baikov et al. |
| 8,589,518 B2 | 11/2013 | Baikov et al. |
| 8,700,681 B2 | 4/2014 | Baikov |
| 9,141,592 B2 | 9/2015 | Baikov et al. |
| 9,280,527 B2 | 3/2016 | Baikov |
| 2001/0029604 A1 | 10/2001 | Dreyband et al. |
| 2002/0143819 A1* | 10/2002 | Han et al. | 707/513 |
| 2003/0004746 A1 | 1/2003 | Kheirolomoom et al. |
| 2003/0005181 A1 | 1/2003 | Bau et al. |
| 2003/0055878 A1 | 3/2003 | Fletcher et al. |
| 2003/0084056 A1 | 5/2003 | DeAnna et al. |
| 2003/0110242 A1 | 6/2003 | Brown et al. |
| 2003/0110373 A1 | 6/2003 | Champion |
| 2003/0163450 A1 | 8/2003 | Borenstein et al. |
| 2003/0191803 A1 | 10/2003 | Chinnici et al. |
| 2003/0204645 A1 | 10/2003 | Sharma et al. |
| 2003/0208505 A1 | 11/2003 | Mullins et al. |
| 2003/0226139 A1 | 12/2003 | Lee |
| 2004/0003033 A1* | 1/2004 | Kamen et al. | 709/203 |
| 2004/0015564 A1 | 1/2004 | Williams |
| 2004/0017392 A1 | 1/2004 | Welch |
| 2004/0045005 A1 | 3/2004 | Karakashian |
| 2004/0054969 A1 | 3/2004 | Chiang et al. |
| 2004/0068554 A1 | 4/2004 | Bales et al. |
| 2004/0088352 A1 | 5/2004 | Kurth |
| 2004/0181537 A1 | 9/2004 | Chawla et al. |
| 2004/0199896 A1 | 10/2004 | Goodman et al. |
| 2004/0216086 A1 | 10/2004 | Bau |
| 2005/0080801 A1 | 4/2005 | Kothandaraman et al. |
| 2005/0091087 A1 | 4/2005 | Smith et al. |
| 2005/0091639 A1 | 4/2005 | Patel |
| 2005/0114394 A1 | 5/2005 | Kaipa et al. |
| 2005/0125524 A1 | 6/2005 | Chandrasekhar et al. |
| 2005/0138041 A1 | 6/2005 | Alcorn et al. |
| 2005/0149552 A1 | 7/2005 | Chan et al. |
| 2005/0154785 A1 | 7/2005 | Reed et al. |
| 2005/0172261 A1 | 8/2005 | Yuknewicz et al. |
| 2005/0203933 A1 | 9/2005 | Chaudhuri et al. |
| 2005/0216488 A1* | 9/2005 | Petrov et al. | 707/100 |
| 2005/0246656 A1 | 11/2005 | Vasilev et al. |
| 2005/0273703 A1 | 12/2005 | Doughan |
| 2005/0278270 A1 | 12/2005 | Carr et al. |
| 2006/0015625 A1 | 1/2006 | Ballinger et al. |
| 2006/0029054 A1 | 2/2006 | Breh et al. |
| 2006/0031433 A1 | 2/2006 | Patrick et al. |
| 2006/0041636 A1 | 2/2006 | Ballinger et al. |
| 2006/0048097 A1 | 3/2006 | Doshi |
| 2006/0136351 A1* | 6/2006 | Angrish et al. | 707/1 |
| 2006/0173984 A1 | 8/2006 | Emeis et al. |
| 2006/0190580 A1 | 8/2006 | Shu et al. |
| 2006/0200748 A1 | 9/2006 | Shenfield |
| 2006/0200749 A1 | 9/2006 | Shenfield |
| 2006/0206890 A1 | 9/2006 | Shenfield et al. |
| 2006/0236302 A1* | 10/2006 | Bateman et al. | 717/104 |
| 2006/0236306 A1 | 10/2006 | DeBruin et al. |
| 2007/0050482 A1 | 3/2007 | Sundstrom et al. |
| 2007/0064680 A1 | 3/2007 | Savchenko et al. |
| 2007/0073221 A1 | 3/2007 | Bialecki et al. |
| 2007/0073753 A1 | 3/2007 | Baikov |
| 2007/0073760 A1 | 3/2007 | Baikov |
| 2007/0073769 A1 | 3/2007 | Baikov et al. |
| 2007/0073771 A1 | 3/2007 | Baikov |
| 2007/0118844 A1 | 5/2007 | Huang et al. |
| 2007/0156872 A1 | 7/2007 | Stoyanova |
| 2007/0203820 A1 | 8/2007 | Rashid |
| 2007/0204279 A1 | 8/2007 | Warshavsky et al. |
| 2007/0245167 A1 | 10/2007 | De La Cruz et al. |
| 2008/0189713 A1 | 8/2008 | Betzler et al. |
| 2008/0307392 A1 | 12/2008 | Racca et al. |
| 2010/0077070 A1 | 3/2010 | Baikov et al. |
| 2014/0075291 A1 | 3/2014 | Baikov et al. |
| 2016/0012026 A1 | 1/2016 | Baikov et al. |

FOREIGN PATENT DOCUMENTS

| | | |
|---|---|---|
| EP | 1 566 940 | 8/2005 |
| WO | WO-03/073309 | 9/2003 |

OTHER PUBLICATIONS

Non-Final Office Action for U.S. Appl. No. 11/239,546 Mailed Dec. 18, 2008, 11 pages.

Final Office Action for U.S. Appl. No. 10/750,058, Mailed Dec. 23, 2008, 14 pages.

"Sun.com, "The J2EE Tutorial: Web Application Archives" sun.com/j2ee/tutorial/1-3-fcs/doc/WCC3.html", 1-4.

Banerji, A., et al., "Web Services Conversation Language (WSCL) 1.0", W3C Note, World Wide Web Consortium, URL http://www.w3.org/TR/wscl10/, (Mar. 2002).

Bussler, Christopher, et al., "A conceptual architecture for semantic web enabled services", Dieter Fensel, Alexander Maedche, ACM SIGMOD Record, v. 31 n.4, (Dec. 2002).

Dustdar, Schahram, et al., "A View Based Analysis on Web Service Registries", Martin Treiber, Distributed and Parallel Databases, v. 18 n.2, (Sep. 2005), 147-171.

Final Office Action, Final Office Action from U.S. Appl. No. 10/749,735 mailed Mar. 17, 2008, 14 pgs.

Huhns, Michael N., et al., Service-Oriented Computing: Key Concepts and Principles, IEEE Internet Computing, Munindar P. Singh, v.9 n.1, (Jan. 2005), 75-81.

Hull, Richard, et al., "Tools for composite web services: a short overview", Jianwen Su, ACM SIGMOD Record, v. 34 n. 2, (Jun. 2005).

Shepherd, George, et al., "Programming with Microsoft Visual C++.Net, Microsoft Press Sixth Edition", (2003), 391-397, 771, 806-807, 820-826.

Sun.com, "The J2EE Tutorial: Web Application Archives", http://java.sun.com/j2ee/tutorial/1_3-fcs/doc/WCC3.html, 4 pgs.

Non-Final Office Action for U.S. Appl. No. 11/232,660, Mailed Dec. 22, 2008, 22 pages.

Abdel-Aziz, A A., et al., "Mapping XML DTDs to relational schemas", IEEE, (2005), pp. 1-4.

Amer-Yahia, S, et al., "A Web-services architecture for efficient XML data exchange", IEEE, (2004), pp. 1-12.

Ege, R K., "Object-oriented database access via reflection", IEEE, (1999), pp. 36-41.

Thomas-Kerr, J, et al., "Bitstream Binding Language – Mapping XML Multimedia Containers into Streams", IEEE, (2005), pp. 1-4.

Final Office Action for U.S. Appl. No. 11/233,203, Mailed Jan. 27, 2009, 16 pages.

Final Office Action for U.S. Appl. No. 11/238,912, Mailed Feb. 4, 2009, 10 pages.

"U.S. Appl. No. 11/232,717, Non Final Office Action mailed Feb. 26, 2009", 18 pgs.

"U.S. Appl. No. 11/238,873, Non-Final Office Action mailed Jul. 7, 2009", 14 pgs.

"U.S. Appl. No. 11/238,912, Advisory Action mailed Jul. 9, 2008", 3 pgs.

"U.S. Appl. No. 11/238,912, Final Office Action mailed Feb. 4, 2009", 9 pgs.

"U.S. Appl. No. 11/238,912, Final Office Action mailed Apr. 30, 2008", 9 pgs.

"U.S. Appl. No. 11/238,912, Non Final Office Action mailed Jun. 26, 2009", 12 pgs.

"U.S. Appl. No. 11/238,912, Non Final Office Action mailed Sep. 10, 2008", 9 pgs.

"U.S. Appl. No. 11/238,912, Non Final Office Action mailed Nov. 16, 2007", 10 pgs.

(56) References Cited

OTHER PUBLICATIONS

"U.S. Appl. No. 11/238,912, Preliminary Amendment filed Jul. 30, 2008", 10 pgs.
"U.S. Appl. No. 11/238,912, Response filed Jan. 11, 2008 to Non Final Office Action mailed Nov. 16, 2007", 9 pgs.
"U.S. Appl. No. 11/238,912, Response filed Apr. 17, 2009 to Final Office Action mailed Feb. 4, 2009", 11 pgs.
"U.S. Appl. No. 11/238,912, Response filed Jun. 20, 2008 to Final Office Action mailed Apr. 30, 2008", 10 pgs.
"U.S. Appl. No. 11/238,912, Response filed Oct. 31, 2008 to Non Final Office Action mailed Sep. 10, 2008", 11 pgs.
"U.S. Appl. No. 11/238,912, Response filed Sep. 28, 2009 to Non Final Office Action mailed Jun. 26, 2009", 10 pgs.
"U.S. Appl. No. 11/238,920 , Non Final Office Action mailed Mar. 12, 2009", 10 pgs.
"U.S. Appl. No. 11/238,921, Non Final Office Action mailed Oct. 30, 2008", 12 pgs.
"U.S. Appl. No. 11/238,921, Notice of Allowance mailed Sep. 3, 2009", 14 pgs.
"U.S. Appl. No. 11/238,921, Response filed Mar. 2, 2009 to Non Final Office Action mailed Oct. 30, 2008", 31 pgs.
"U.S. Appl. No. 11/238,921, Response filed Jun. 23, 2009 to Non Final Office Action mailed Oct. 30, 2008", 32 pgs.
"U.S. Appl. No. 11/239,546, Advisory Action mailed Aug. 3, 2009", 3 pgs.
"U.S. Appl. No. 11/239,546, Non Final Office Action mailed Jun. 2, 2009", 17 pgs.
"U.S. Appl. No. 11/239,546, Non Final Office Action mailed Dec. 18, 2008", 10 pgs.
"U.S. Appl. No. 11/239,546, Response filed Feb. 27, 2009 to Non Final Office Action mailed Dec. 18, 2008", 5 pgs.
"U.S. Appl. No. 11/239,546, Response filed Jul. 20, 2009 to Final Office Action mailed May 19, 2009", 9 pgs.
"U.S. Appl. No. 11/322,567, Non Final Office Action mailed Dec. 31, 2007", 12 pgs.
"U.S. Appl. No. 11/238,873, Response filed Oct. 29, 2009 to Non Final Office Action mailed Jul. 7, 2009", 14 pgs.
"U.S. Appl. No. 11/238,912 , Final Office Action mailed Jan. 20, 2010", 8 pgs.
"U.S. Appl. No. 11/238,921, Notice of Allowance mailed Nov. 19, 2009", 7 pgs.
"U.S. Appl. No. 11/238,912, Pre-Appeal Brief Request mailed Mar. 18, 2010", 5 pgs.
"U.S. Appl. No. 12/629,819, Preliminary Amendment filed Jan. 14, 2010", 8 pgs.
"U.S. Appl. No. 11/238,873, Final Office Action mailed May 10, 2010", 14 pgs.
"U.S. Appl. No. 11/238,873, Non Final Office Action mailed Dec. 8, 2010", 12 pgs.
"U.S. Appl. No. 11/238,873, Response filed Jul. 23, 2010 to Final Office Action mailed May 10, 2010", 10 pgs.
"U.S. Appl. No. 11/238,873, Final Office Action mailed May 11, 2011", 14 pgs.
"U.S. Appl. No. 11/238,873, Notice of Allowance mailed Apr. 19, 2012", 10 pgs.
"U.S. Appl. No. 11/238,873, Response filed Mar. 3, 2011 to Non Final Office Action mailed Dec. 8, 2010", 12 pgs.
"U.S. Appl. No. 11/238,873, Response filed Aug. 9, 2011 to Final Office Action mailed May 11, 2011", 14 pgs.
"U.S. Appl. No. 11/238,912, 312 Amendment filed Feb. 19, 2014", 15 pgs.
"U.S. Appl. No. 11/238,912, Appeal Brief filed Jun. 28, 2010", 23 pgs.
"U.S. Appl. No. 11/238,912, Appeal Decision mailed Aug. 20, 2013", 5 pgs.
"U.S. Appl. No. 11/238,912, Decision on Pre-Appeal Brief Request mailed May 28, 2010", 2 pgs.
"U.S. Appl. No. 11/238,912, Examiner's Answer to Appeal Brief mailed Sep. 15, 2010", 9 pgs.
"U.S. Appl. No. 11/238,912, Notice of Allowance mailed Nov. 19, 2013", 12 pgs.
"U.S. Appl. No. 11/238,912, Supplemental Examiner's Answer to Appeal Brief mailed Sep. 28, 2010", 2 pgs.
"U.S. Appl. No. 12/628,819, Non Final Office Action mailed May 16, 2011", 8 pgs.
"U.S. Appl. No. 12/629,819, Examiner Interview Summary mailed Jul. 11, 2013", 2 pgs.
"U.S. Appl. No. 12/629,819, Final Office Action mailed Nov. 22, 2011", 9 pgs.
"U.S. Appl. No. 12/629,819, Notice of Allowance mailed Jul. 15, 2013", 14 pgs.
"U.S. Appl. No. 12/629,819, Response filed Feb. 21, 2012 to Final Office Action mailed Nov. 22, 2011", 11 pgs.
"U.S. Appl. No. 12/629,819, Response filed Aug. 1, 2011 to Non Final Office Action mailed May 16, 2011", 9 pgs.
"U.S. Appl. No. 14/082,647, Preliminary Amendment mailed Dec. 5, 2013", 6 pgs.
Anwar, Muhammad, et al., "Multi-Agent Based Semantic E-Government Web Service Architecture Using Extended WSDL", http://delivery.acm.org/10.1145/1200000/1194805/27490599.pdf, (Dec. 2006), 4 pgs.
Barrett, Ronan, et al., "Model Driven Distribution Pattern Design for Dynamic Web Service Compositions", http://delivery.acm.org/10.1145/1150000/1145612/p129-barrett.pdf, (Jul. 2006), 8 pgs.
Brambilla, Marco, et al., "Model-Driven Design and Developement of Semantic Web Service Applications", http://delivery.acm.org/10.1145/1300000/1294151/a3-brambilla.pdf, (Nov. 2007), 31 pgs.
"U.S. Appl. No. 14/859,912, Corrected Notice of Allowance mailed Jan. 20, 2016", 2 pgs.
"U.S. Appl. No. 14/082,647, Notice of Allowance mailed Jun. 4, 2015", 12 pgs.
"U.S. Appl. No. 14/859,912, Notice of Allowance mailed Dec. 22, 2015", 10 pgs.
"U.S. Appl. No. 14/859,912, Preliminary Amendment filed Oct. 27, 2015", 8 pgs.

* cited by examiner

METHOD AND SYSTEM FOR UNIFYING CONFIGURATION DESCRIPTORS

TECHNICAL FIELD

Embodiments of the invention generally relate to the field of web service and, more particularly, to a system and method for unifying configuration description files.

BACKGROUND

Efforts are being made to more easily conduct business in a web-based environment. "Web Services" is loosely understood to mean the ability to discover and conduct business in a web-based environment. For example, a user (e.g., a web-based application or person with a web browser) may: 1) search through an on line registry of businesses and/or services; 2) find a listing in the registry for web based access to a service that that the user desires to have performed; and then, 3) engage in a web-based business relationship with the service application including the passing of relevant information (e.g., pricing, terms, and conditions) over the network. In other words, web services generally refer to offerings of services by one application to another via the World Wide Web.

Given the nature and use of web services and the rapid increase in their demand, interoperability of web services across clients and servers is becoming increasing important and cumbersome. Some attempts have been made to achieve interoperability across a wide range of platforms and runtimes. For example, using open standards like eXtensible Markup Language (XML), Simple Object Access Protocol (SOAP), Web Services Description Language (WSDL), and Universal Description, Discovery, and Integration (UDDI), some interoperability has been achieved.

FIG. 1 illustrates a prior art web services platform 100. The platform 100 shows various XML-related standards 102-110 that are used in connection with web services to attempt interoperability. The illustrated standards include XML Namespaces 102, similar to Java package names, to provide syntax for data representation in portable format. SOAP 104 refers to a standard packaging format for transmitting XML data between applications over a network. XML schema 106 refers to World Wide Web Consortium (W3C) schema specification for XML documents. WSDL 108 is standard used for describing the structure of XML data that is exchanged between systems using SOAP 104. Finally, UDDI 110 refers to a standard SOAP-based interface for web services registry and defines a set of web services operations and methods that are used to store and search information regarding web services applications.

However, the open standards are not evolving fast enough to keep up with the increasing demand for web services and needs of additional flexibility and control on the client-side. One of the problems today is the convoluted relationships and mappings between relevant standards. Neither the interoperability nor the client-side flexibility and control are sufficiently achieved because of the conventional separation of models and entities for web services (WS) and web service clients (WSC). FIG. 2 illustrates a prior art web services model 200. The illustrated web services model 200 includes Web service definition 204, which includes the description of design-time configuration of a web service. Web service configurations 206 refer to the description of the run-time configurations of a web service. The web services model 200 further includes a virtual interface 202. A virtual interface 202 refers to an abstract interface.

Referring now to FIG. 3, it illustrates a prior art web services client model 300. In the illustrated web services client model 300, schema to Java (STJ) mappings 302 contain serializer classes and deserializer classes of the XML Schema Definition (XSD) Types. However, the conventional STJ mappings 302 do not contain any field or operation-specific mappings. The conventional model 300 further includes logical ports 304 that are limited to containing merely runtime (RT) relevant configurations and do not contain design-time (DT) configurations. Finally, the illustrated WSDL 306 contains a parsed WSDL structure.

Although the conventional models 200, 300 provide some flexibility, further improvements are needed to achieve interoperability. For example, the conventional model 200 provides provider-oriented inside-out approach for web services, but it does not support consumer-based outside-in approach for web services, which is becoming increasingly important. The conventional models 200, 300 do not provide similar modeling approach for developing web services and web services client which leads to usability deficiencies.

SUMMARY

A method and system for provided for unifying web services and web services client configuration description files. In one embodiment, a web services configuration file and a web services client configuration file are identified. The web services and web services client configuration files are unified to create a configuration file.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1:
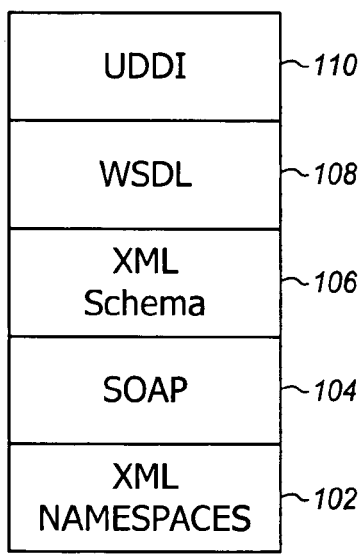
FIG. 1 illustrates a prior art web services platform.
Figure 2:
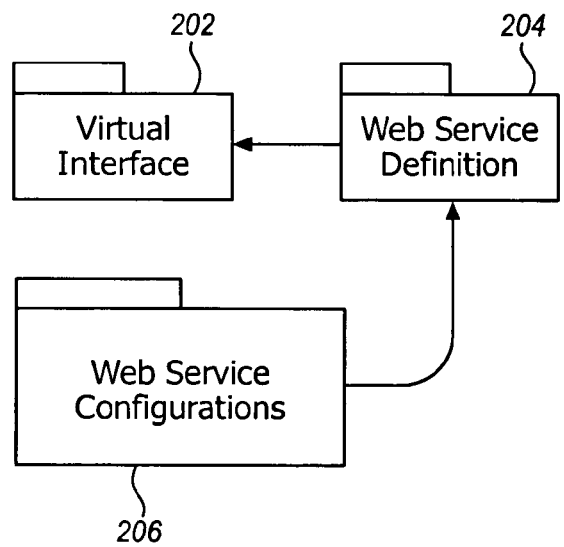
FIG. 2 illustrates a prior art web services model.
Figure 3:
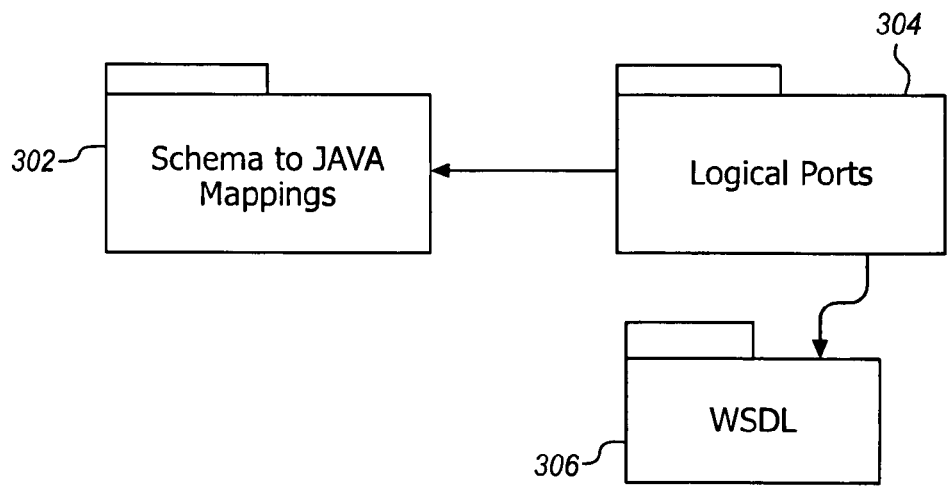
FIG. 3 illustrates a prior art web service client model.

Described below is a system and method for generating a common web services model on the java stack. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), Digital Video Disk ROM (DVD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 4:
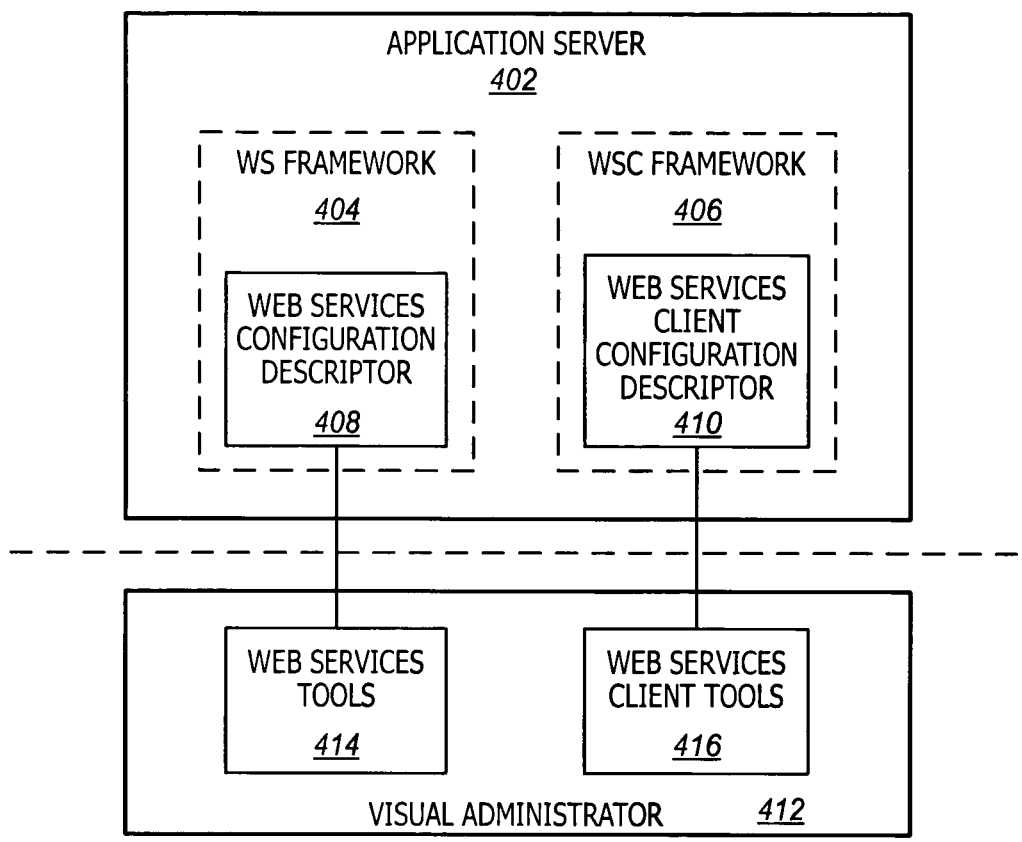
FIG. 4 illustrates an environment employing separate web services and web services client configuration descriptor files.

FIG. 4 illustrates an environment 400 employing separate web services and web services client configuration descriptor files 408, 410. As illustrated, in environment 400, the web services descriptor 408 and the web services client descriptor 410 are needed for web services and web services client, respectively. The separate descriptors 408, 410 reside in separate environments or frameworks (frameworks) 404, 406 at an application server 402. As illustrated, the web services descriptor 408 resides within the web services environment 404, while the web services client descriptor 410 resides at the web services client environment 406 at the host application server 402.

Although the application 404 is capable of being used by a number of providers and consumers, separate WS and WSC descriptors 406, 408 are limited to providing merely the provider-oriented inside-out approach. Typically, a WS descriptor 408 contains interfaces for web services in Java terms, while a WSC descriptor 410 contains interfaces for web services client and mappings for WSDL to Java. The WS descriptor 408 further includes WS deployment descriptions having runtime properties, while design-time properties are often contained in a WS definition file residing at a virtual interface (VI). The WS descriptor 408 further includes WS formats and models, while the WSC descriptor 410 further includes WSC formats and models. As illustrated, two separate descriptors 408, 410 necessitate two separate sets of tools 414, 416 at the visual administrator (VA) 412 to access the descriptors 408, 410 and to serialize and/or deserialize them, which further necessitates separate APIs, longer start time, additional resources.

Figure 5:
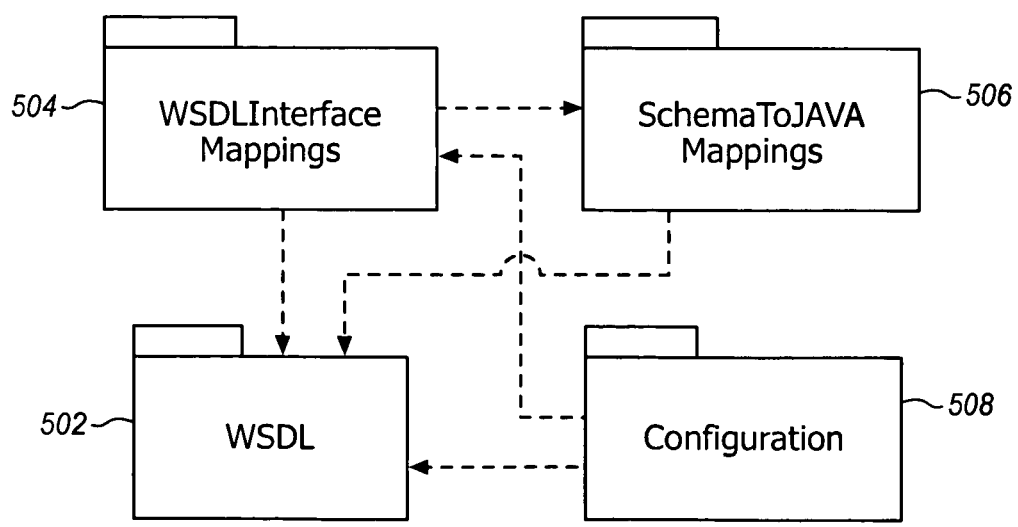
FIG. 5 illustrates an embodiment of a common meta model for web services and web service client.

FIG. 5 illustrates an embodiment of a common meta model 500 for web services and web service client. In the illustrated embodiment, a meta model 500 is generated by unifying various models 502-508 into a single common model (common model) 500. For example, the common model 500 includes a WSDL model 502, which refers to a model for describing the WSDL structure of the web services that are developed within an application, and/or WSDL files that are used to generate WS client proxies. The WSDL model 502 may also contain WSDL relevant extensions. The WSDL interface mappings (WSDL IM) model 504 refers to a model for describing mappings between the Java Service Endpoint (JSE) Interface (e.g., generated proxy service interface) and its WSDL representation, such as the names of the Java method and WSDL operation representing the method, default values of parameters, etc.

The illustrated Schema to Java mappings model 506 is used for describing mappings between XSD types and Java classes representing these types, such as the names of the fields. The configuration model 508 includes the design-time and runtime configuration of web services and web services client. The configuration model 508 logically references the WSDL model 502 and the WSDL IM model 504, which, in turn, references the STJ mappings model 506.

As illustrated, in one embodiment, a common model 500 is provided for WS and WSC frameworks to perform development, deployment and configuration of applications with relative ease. WS and WSC frameworks may reside on a Java 2 Enterprise Edition (J2EE) engine. In one embodiment, the common model 500 is migrated to the J2EE engine to run and use the WS/WSC proxy on the J2EE engine to provide a common model for WS and WSC frameworks. Such migration can be performed using various migration controllers and interfaces that are used for application development. In one embodiment, the common configuration is achieved by having a common configuration entity in the configuration model 508. Common design utilities are provided using a common interface mapping model 504 and a common schema to Java mapping model 506, while common deployment entities are provided with insignificant differences between client and server.

In one embodiment, common models 502-508 are managed by a common framework at the J2EE engine. The common model 500 is created by, first, identifying those elements, features, and components (components or properties) that are common to both web services model and web services client model. Once such common components are identified, they are then extracted and put together to create a common WS model. It is contemplated that those components that are necessary and/or preferred are used to create the common framework, while those components that are not regarded as necessary and/or preferred may not be used. Further, the use of such common components helps support the deployment of web services and web services client in a common way. For example, SAP administrative tools model can be converted in light of the common framework to separate the WS tools in the SAP Administrative tools from the J2EE engine because of the different requirements associated with the SAP Administrative tools and the J2EE engine. Examples of administrative tools include various Integrated Development Environment (IDE) tools (e.g., IDE wizard and IDE views) and other SAP-based IDE and administrative tools, such as SAP NetWeaver Developer Studio, SAP Visual Administrator, and SAP NetWeaver Administrator. Further, SAP's IDE can be based on the Eclipse IDE and may contain additional SAP developed plugins.

In the illustrated embodiment, the common model 500 combines the requirements from both the provider and consumer scenarios and is suitable to be used by both the service and client platforms. This is performed such that the common elements of functionality are adopted, while the uncommon elements work side-by-side not only without interfering with each other, but by complementing each other in the common model 500. In one embodiment, common models 502-508 are generated and employed and further, they are directly mapped in a common model 500 via any number of programming languages that are right for the time (e.g., C, C++, C#, Java, and ABAP). Further, a generator, such as a proxy generator or a code generator, modules, interfaces, and components are employed to form common models 502-508, generate WSDL model, form direct mapping between models 502-508 and between web services interfaces and Java interfaces.

The common model 500 eliminates the need for the conventional virtual interface for storing the data (e.g., description of the interface and its types). In one embodiment, web services interface data is separate between the WSDL model 502 and the two mapping models 504, 506. Using this technique, SOAP extensions are not longer necessary as the need for VI to WSDL conversion is eliminated. Using the common model 500, web interfaces are described in the WSDL model 502 as opposed to a virtual interface. Further, the interface mapping information is used to describe the mapping of web interfaces to Java interfaces (e.g., Java SEI). Then, multiple design time configurations can be attached to a single interface as an alternative.

Furthermore, the web services definition, which can be used to describe an alternative design-time configuration, is made part of the design-time part of the configuration model 508. This helps eliminate the need for generating several portTypes based on the web services definition, which would otherwise be necessary because the configuration would have to be expressed in the form of WSDL extensions. In one embodiment, a WS-policy standard is used to express configuration of web services and consequently, several alternative configurations can be expressed using one WSDL portType. A WS-policy standard can be dynamically created in which various parameters can be defined as necessary or desired. Further, a client proxy generated out of such WSDL may contain a single service endpoint interface (SEI), which has a superior use for the application developer using it as proxy. An SEI can be used to specify methods of the Java class that are to be exposed as web services operations, which are included and published in the WSDL model 502 as the portType that a client application uses to invoke web services.

In one embodiment, the STJ mappings model 506 contains not only serializer and deserializer classes, but also other field and operation-specific mappings information. Using the STJ mappings model 506 having such information helps facilitate various kinds of mappings, such as names of getter/setter methods of a specific field, if an attribute is presented as a data member or with getters/setters, etc. Moreover, although the conventional logical ports are limited to containing only real-time configurations, the illustrated embodiment of the configuration model 508 contains and maintains not only real-time configuration information, but also contains and maintains design-time configuration information. Various mapping files and interfaces may be used to map the individual models 502-508 into the common model 500.

The illustrated WSDL model 502 includes a WSDL file that specifies the WSDL structure, including message formats, Internet protocols, and addresses, that a client may use to communicate with a particular web service. Using the basic structure of WSDL, a WSDL document includes an XML document that adheres to the WSDL XML schema. A WSDL document contains various components and elements (e.g., biding, import, message, operation, portType, service, and types) that are rooted in the root element (e.g., definitions element) of the WSDL document.

The binding element is used to assign portTypes and its operation elements to a particular protocol (e.g., SOAP) and encoding style. The import element is used to import WSDL definitions from other WSDL documents (such as those similar to an XML schema document import element). The message element describes the message's payload using XML schema built-in types, complex types, and/or elements defined in the WSDL document's type elements. The operation and portType elements describe web service's interface and define its methods and are similar to Java interfaces and their method declarations. The service element is used for assigning an Internet address to a particular binding. The type element uses the XML schema language to declare complex data types and elements that are used elsewhere in the WSDL document. The WSDL IM model 504 is used for describing the mappings between the Java SEI and its WSDL representation.

The STJ mappings model 506 contains a model for describing the mappings between XSD types and Java classes representing a group of classes and interfaces in Java packages, such as a name which is either derived from the XML namespace URI, or specified by a binding customization of the XML namespace URI, a set of Java content interfaces representing the content models declared within the schema, and a set of Java element interfaces representing element declarations occurring within the schema. The configuration model 508 includes both the design-time and runtime configuration of web services and web services clients. The configuration model 508 may also include one or more description descriptors or files, such as XML configuration files, deployment descriptors, etc.

In one embodiment, the WSDL IM model 504 contains reference to and uses elements of interfaces with the WSDL model 502. The WSDL IM model 504 further contains reference to the STJ mappings model 506. The STJ mappings model 506, on the other hand, references to the WSDL model 502 and uses elements from the WSDL model 502. Examples of the elements that the STJ mappings model 506 uses include elements of XSD and/or type elements, such as complex type and simple type. The configuration model 508 contains reference to the WSDL model 502 and the WSDL IM model 504.

A virtual interface refers to an abstract interface and/or a type description system that is created based on a programming language interface (e.g., Java interface and ABAP methods). A virtual interface can be used to decouple the language-specific implementation from interface description. A web service refers to an interface of the web service as described by the WSDL file at the WSDL model 502, which describes web services methods and web services type systems, such as the XML messages transmitted upon the web services invocation. When the web service interface is generated via the virtual interface, it is done by having Java classes build the virtual interface to generate the WSDL file (web interface). This process of WSDL generation is carried in the engine by the WS runtime, while the virtual interface contains hints for WSDL generation details called SOAP extensions. A WSDL file provides proxy generator which generates Java classes (web services client proxy) and logical ports (that contain web services client configuration). Using the web services client proxy classes, application invoke the web services described by the WSDL file. Also, using logical ports, applications configure the web services client proxy.

In one embodiment, virtual interfaces and the virtual interface model are eliminated by having the web services development based on WSDL (web services interface) at the WSDL model 502 in an outside-in scenario. For example, on the server side, WSDL 502 provides proxy generator which generates default mappings that are then changed (e.g., updated as the desired by the developer or as necessitated) using an administrative/IDE tool, such as an SAP NetWeaver Administrator, SAP NetWeaver Developer Studio, IDE wizard, etc. This is then used by the proxy generator to generate Java beans with mapped Java methods and WSDL 502 and mappings and the configuration model 508. A developer can implement methods (logic) of the bean and thus, providing logic to the web services methods. Furthermore, the conventional inside-out scenario can be customized using administrative and/or IDE tools to be compatible with the new model 500. For example, in one embodiment, Java classes can created a virtual interface that generates default WSDL which proves a proxy generator which further generates default mappings. These default mappings (e.g., default Java mappings) are then changed or updated or customized to reflect the original Java interface for which the common WS model 500 can be used by using/reusing the outside-in deployment. On the client side, in one embodiment, WSDL at the WSDL model 502 provides a proxy generate which generates Java files and mappings and the configuration model 508. This mechanism provides having the same deployment entities for adapting various scenarios (e.g., inside-out and outside-in) and allows the common model 500 for development of such scenarios.

Figure 6:
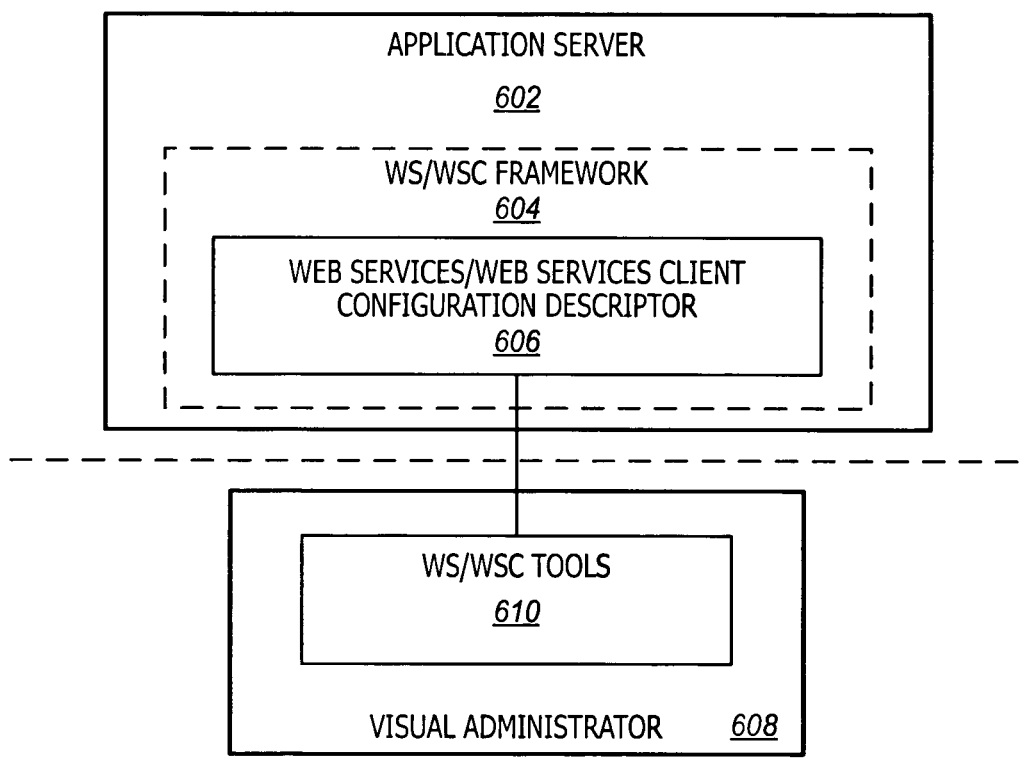
FIG. 6 illustrates an embodiment of an environment for employing a unified web services and web services client configuration descriptor.

FIG. 6 illustrates an embodiment of an environment 600 for employing a unified web services and web services client configuration descriptor 606. The properties relating to separate web services and web services client descriptors are identified, a number of properties are removed (e.g., those that are unnecessary and/or undesired) other properties are kept (e.g., those that are common to both descriptors, necessary, and/or desired). The properties include components, elements, interfaces, modules, formats, and the like. Also, formats of separate descriptors are identified and a common format is then created that is suitable for both the web services and the web services client configurations. Once a common format is created, frameworks of different descriptors are identified and a common environment or framework (common framework) 604 is created. The common framework 604 is used to employ a common or unified WS-WSC configuration descriptor (common descriptor) 606. As illustrated, in one embodiment, common or unified WS-WSC tools (common tools) 610 are provided at the VA 608 for visualizing, accessing, configuring/reconfiguring, and loading/reloading the common descriptor 606. Having a common descriptor 606 eliminates the need for multiple or separate tools. Common tools 610 include various configuration, developmental, and administrative tools to work with the common descriptor 606.

In one embodiment, a common model and mapping system of FIG. 4 can be used to provide direct mapping of various web services and web services client models and such direct mappings are used to create the common descriptor 606. For example, direct mappings of various models within a common model is employed to established direct mappings of various components of separate WS and WSC descriptors into creating a common framework 604 and into further creating a common descriptor 606. Common tools 610 may be separately created and employed to access and obtain a common view of the common descriptor 606 so that the user does not have to regard the WS and WSC descriptors as separate files. The common descriptor 606 also provides a faster start time since the same file (as opposed to separate files) is to be used. Furthermore, using the common descriptor 606, a common API can be used to serve as both the server API and the client API, a common code can be used for deployment of the common descriptor 606 instead of using multiple codes, and a common API can be for various runtime protocols (e.g., security protocol and session protocol). Moreover, since a common format can be used for the common descriptor 606, a common code can be also be used for writing, reading, and editing of the common descriptor 606. The common descriptor 606 also supports the outside-in approach that is client/consumer-oriented, while supporting the inside-out approach that is server/provider-oriented.

In one embodiment, the application lifecycle is reconfigured into a simpler common lifecycle. The parts of design, deployment, and configuration of the application lifecycle can be combined such that they can be performed by the same user. For example, design, deployment, configuration can be performed by a single developer or administrator instead of the conventional way of being assigned to separate users (e.g., design to the developer, and configuration to the administrator). The design part includes creating interfaces, data services, and code for the application structure and appearance. The deployment part refers to running the application creating during design and to transforming the application by changing the structure of the descriptors into a new structure. The configuration part includes performing configuration of the application after its deployment. Configuration during design time is considered default time, but once the deployment is performed, further configuration can be performed.

Figure 7:
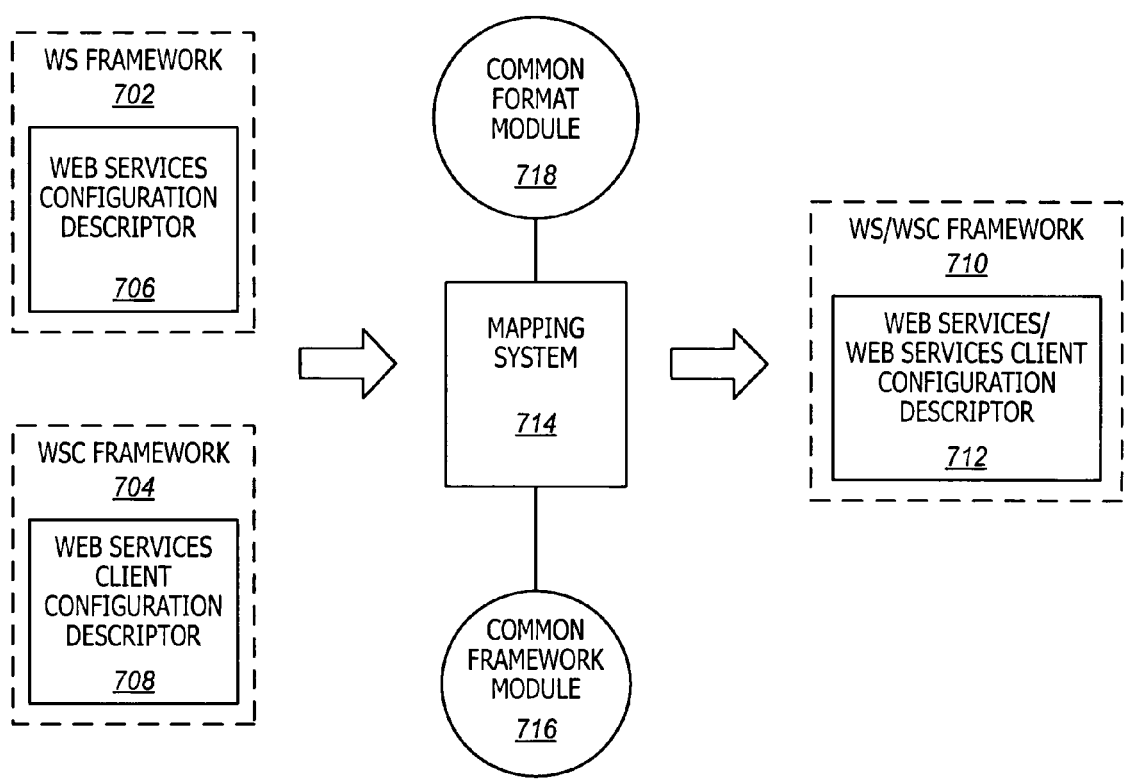
FIG. 7 illustrates an embodiment of an environment for unifying separate configuration descriptors into a common configuration descriptor.

FIG. 7 illustrates an embodiment of an environment 700 for unifying separate configuration descriptors 706, 708 into a common configuration descriptor 712. In one embodiment, separate web services and web services configuration descriptors 706, 708 are unified into a common web services-web services client configuration descriptor 712. The illustrated WS configuration descriptor 706 resides within a WS framework 702, while the WSC configuration descriptor 708 resides within a WSC framework 704. Also, for example, both frameworks 702, 704 may reside at an application server at a J2EE engine.

In one embodiment, a mapping system 714 that facilitates generation a common model, such as the one illustrated in FIG. 4, can be used to also help unify the separate configuration descriptors 706, 708. In another embodiment, a new mapping system 714 is created to unify the configuration descriptors 706, 708. The mapping system 714 may include the necessary modules, component, and elements to provide direct mapping of various WS and WSC models (e.g., WSDL model, configuration model, Java to Schema mappings model, and WSDL interface mappings model) into a common unified model. The mapping system 714 includes one or more unifying modules to unify and integrate the configuration descriptors 706, 708. In one embodiment, properties of WS and WSC descriptors 706, 708 are identified and evaluated. Upon analyzing such properties, certain properties are kept as they are desired, necessary, and/or common to both descriptors 706, 708, while certain other properties may not be kept or changed so they are compatible with the new common descriptor 712.

In one embodiment, as part of identifying and evaluating properties, formats for separate descriptors 706, 708 are also identified and analyzed using a common format module 718. Using the properties of these formats, a new common format is created that is appropriate for the common descriptor 712. The common format module 718 is created separately and is used for identifying different formats and further for creating a common format that is compatible with the common descriptor 712, i.e., that format that can handle configurations of both the web services and web services client. In one embodiment, the common format module 718 is used in combination with the mapping system 714 to generate the common format for the common descriptor 712.

In one embodiment, the mapping system 714 is then used with a common framework module 716 to generate a common framework 710 where the common descriptor 712 can reside. The common framework 710 includes a pluggable framework that could be used not only to have the common descriptor 712, but also can be used to add, delete, and amend any number of protocols, components, and elements so that the common framework 710 and the common descriptor 712 remain dynamic.

Using the common framework module 716 and the mapping system 714, the descriptors 706, 708 are separately identified and analyzed to determine those properties that are common to both descriptors 706, 708 and/or are necessary. Some of the properties are maintained in the new common framework 712; however, other properties can be deleted or updated/amended and even new properties can be added to the existing ones to help achieve better efficiency and compatibility of web services and web services client. The mapping system 714 is further used to introduce to initialize the WS and WSC at runtime. Also, a common API is also added to the common framework 710 to replace multiple APIs that are typically needed for WS and WSC.

Figure 8:
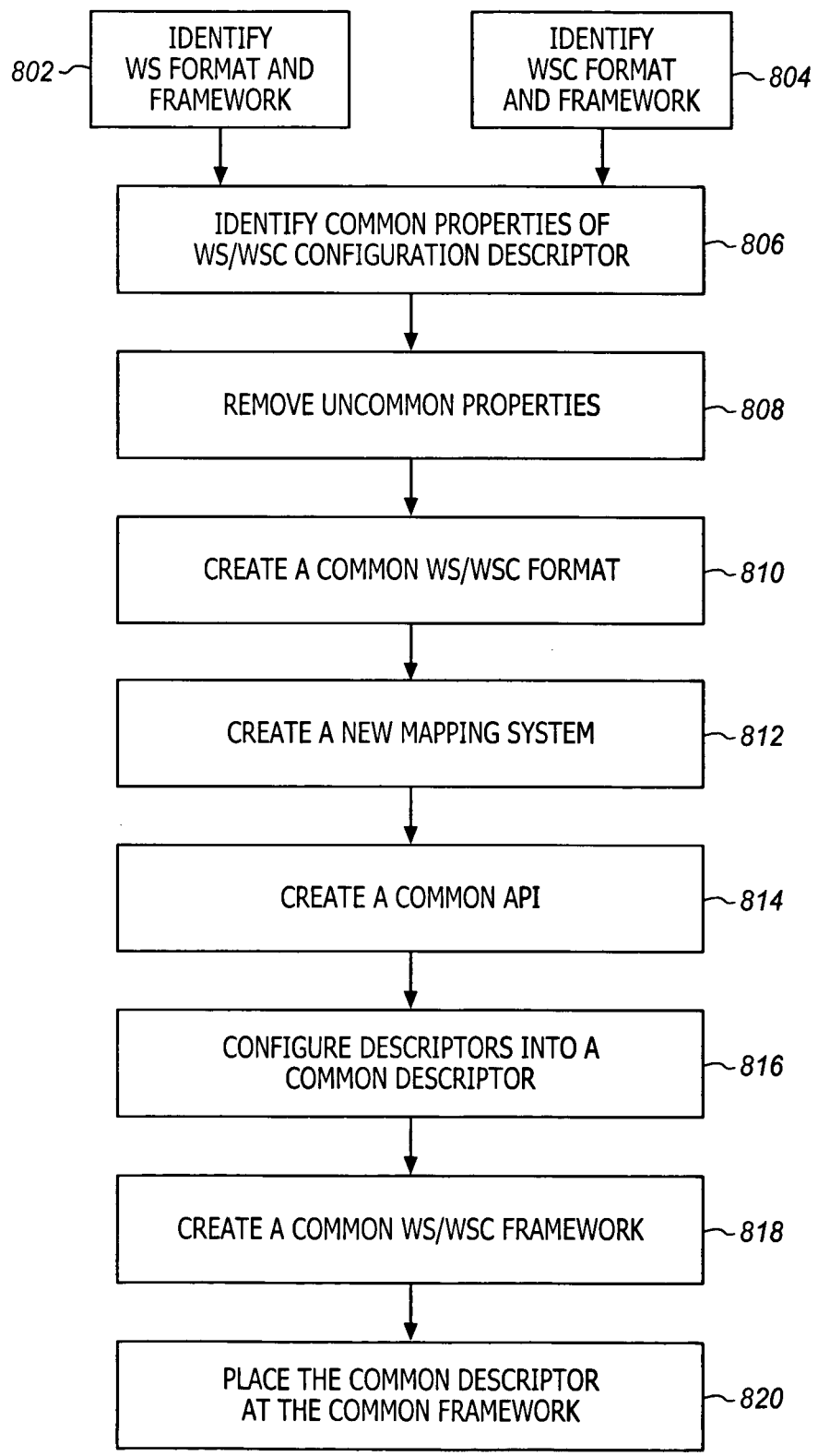
FIG. 8 illustrates an embodiment of a process for unifying web services and web services client configuration descriptors.

FIG. 8 illustrates an embodiment of a process for unifying web services and web services client configuration descriptors. At processing blocks 802 and 804, frameworks and formats for web services and web services client configuration descriptors are identified. Once the formats are identified, common properties, functions and/or components (properties) of the WS and WSC configuration descriptors are identified at processing block 806. At processing 808, properties or data that uncommon, unnecessary, and/or unwanted are removed. For example, interface mappings or type mappings that were previously described can be removed. A common WS-WSC format is then created that can be used by both the web services and web services client to handle configuration that is suitable for both the web services and web services client at processing block 810.

At processing block 812, a new mapping system is created using a mapping module. The mapping system is used to initialize the WS and WSC runtime. A common API is then created at processing block 814. For example, XML schema may be created for defining the XML file format by creating XSD. The API may also be used for ready WSDL and for defining the WSDL model. Further, the common API may also be used to serve as a Java-based API. At processing block 816, the mapping system is used to unify the separate configuration descriptors into a common descriptor. The common descriptor is created using the common format. At processing block 818, a common framework is created to host the common descriptor with the common format. The common descriptor with the common format is placed at the common framework at processing block 820.

Figure 9:
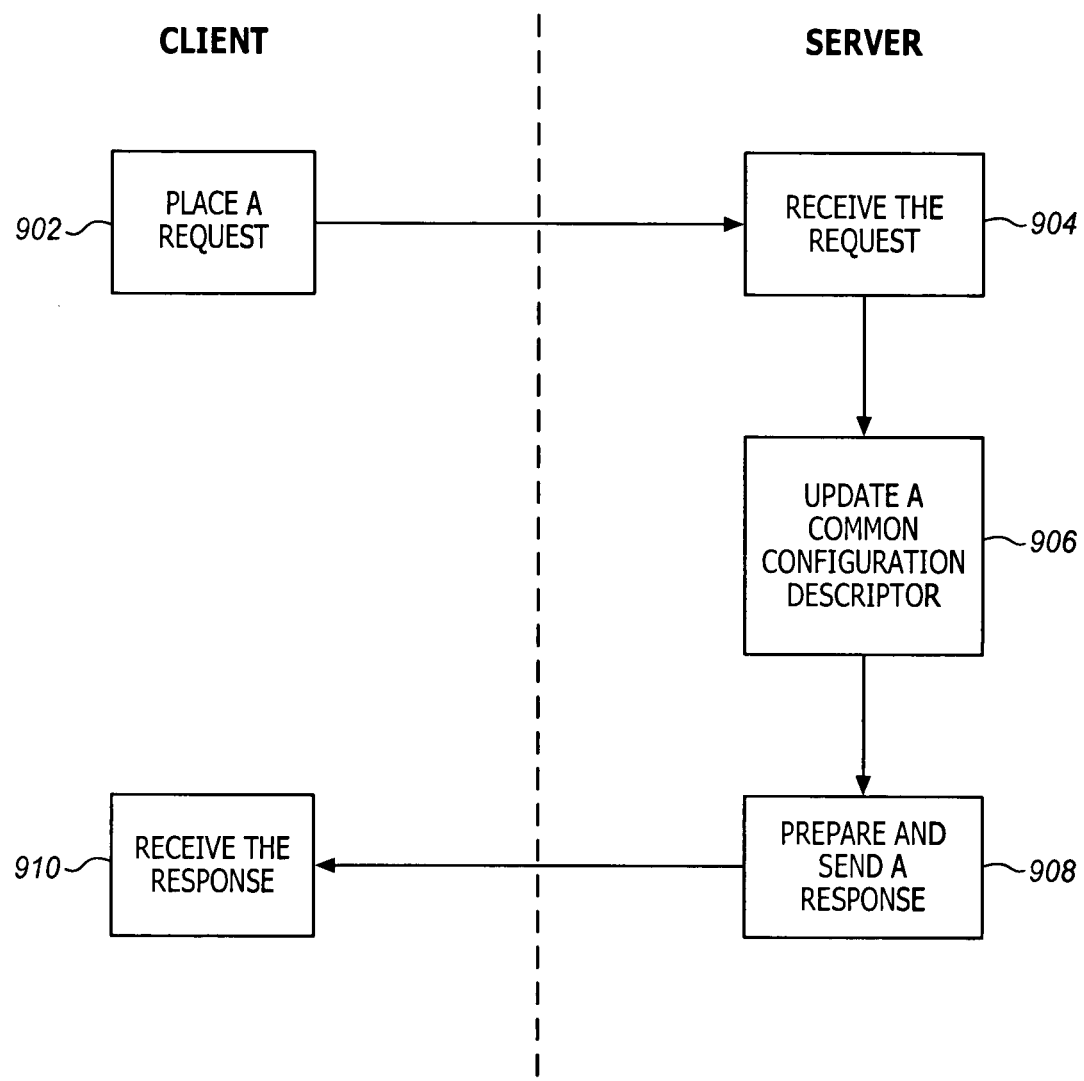
FIG. 9 illustrates a transaction sequence for using a common configuration descriptor.

FIG. 9 illustrates a transaction sequence for using a common configuration descriptor. A request is placed via a client 902. The request may include any update to the application that necessitates reconfiguration of the configuration descriptor, such as requesting a new mechanism for authorization/authentication (e.g., requesting that an authentication certification be required along with a user ID and password) for access a system. The request is received at the server 904. Having a common configuration descriptor, a single common descriptor is updated 906 (as opposed to updating separate WS descriptor and WSC descriptors). Once the reconfiguration is performed, the common descriptor is updated and reloaded. For example, the authentication/authorization mechanism is changed to require user ID, password, and authentication certificate to access the system as requested by the user. A response is then prepared and sent to the client 908. The response is received at the client 910.

The architectures and methodologies discussed above may be implemented with various types of computing systems such as an application server that includes a J2EE server that supports Enterprise Java Bean (EJB) components and EJB containers (at the business layer) and/or Servlets and Java Server Pages (JSP) (at the presentation layer). Of course, other embodiments may be implemented in the context of various different software platforms including, by way of example, Microsoft®.NET, Windows®/NT, Microsoft Transaction Server (MTS), the ABAP platforms developed by SAP AG and comparable platforms.

Figure 10:
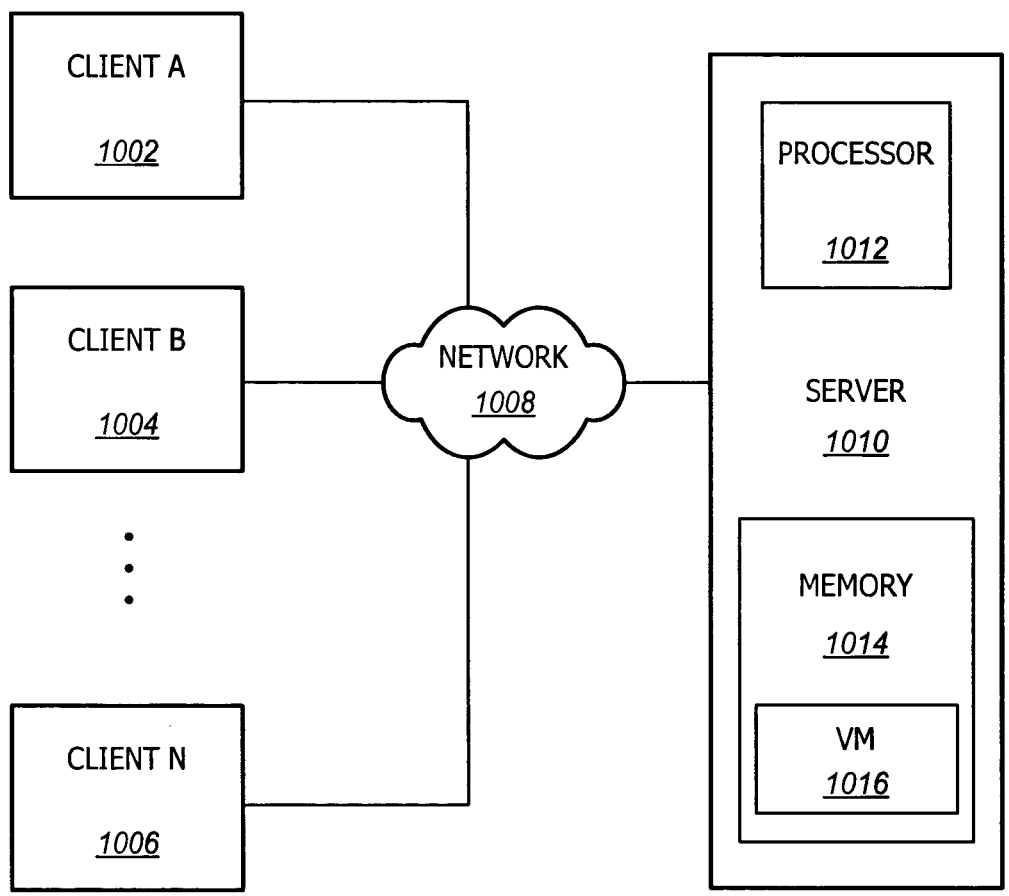
FIG. 10 illustrates an exemplary client/server system used for implementing an embodiment of the invention.

FIG. 10 illustrates an exemplary client/server system 1000 used in implementing one or more embodiments of the invention. In the illustrated embodiment, a network 1008 links a server 1010 with various client systems A-N 1002-1006. The server 1010 is a programmable data processing system suitable for implementing apparatus, programs, or methods in accordance with the description. The server 1010 provides a core operating environment for one or more runtime systems that process user requests. The server 1010 includes a processor 1012 and a memory 1014. The memory 1014 can be used to store an operating system a Transmission Control Protocol/Internet Protocol (TCP/IP) stack for communicating over the network 1008, and machine-executable instructions executed by the processor 1012. In some implementations, the server 1010 can include multiple processors, each of which can be used to execute machine-executable instructions.

The memory 1014 can include a shared memory area that is accessible by multiple operating system processes executing at the server 1010. An example of a suitable server to be implemented using the client/server system 1000 may include J2EE compatible servers, such as the Web Application Server developed by SAP AG of Walldorf, Germany, or the WebSphere Application Server developed by International Business Machines Corp. (IBM®) of Armonk, N.Y.

Client systems 1002-1006 are used to execute multiple applications or application interfaces. Each instance of an application or an application interface can constitute a user session. Each user session can generate one or more requests to be processed by the server 1010. The requests may include instructions or code to be executed on a runtime system (e.g., the virtual machine (VM) 1016) on the server 1010. A VM 1016 is an abstract machine that can include an instruction set, a set of registers, a stack, a heap, and a method area, like a real machine or processor. A VM 1016 essentially acts as an interface between program code and the actual processor or hardware platform on which the program code is to be executed. The program code includes instructions from the VM instruction set that manipulates the resources of the VM 1016.

Figure 11:
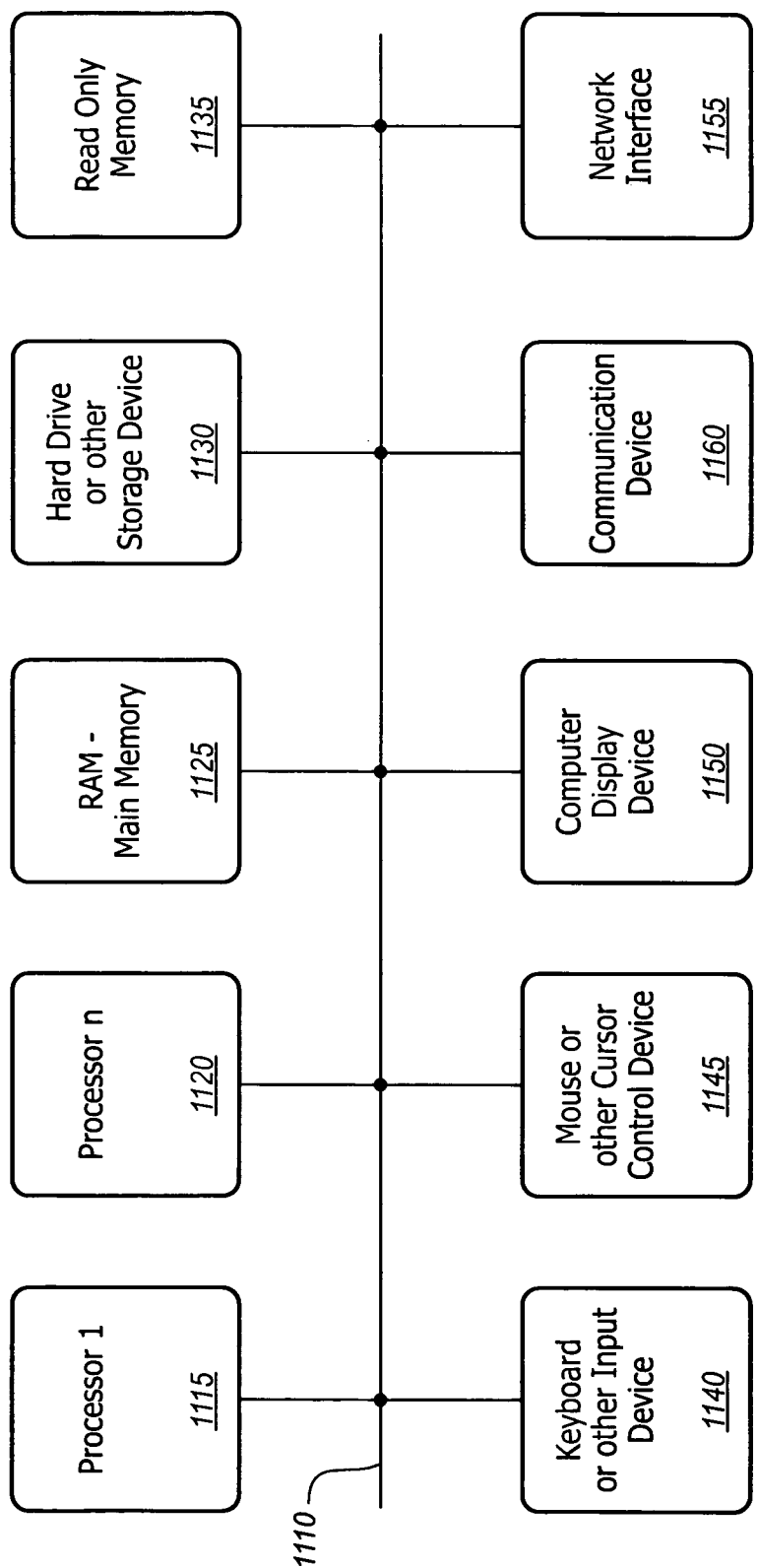
FIG. 11 is an exemplary computer system used for implementing an embodiment of the invention.

FIG. 11 is an exemplary computer system 1100 used in implementing an embodiment of the present invention. In this illustration, a system 1100 comprises a bus 1110 or other means for communicating data. The system 1100 includes one or more processors, illustrated as shown as processor 1 1115 through processor n 1120 to process information. The system 1100 further comprises a random access memory (RAM) or other dynamic storage as a main memory 1125 to store information and instructions to be executed by the processor 1115 through 1120. The RAM or other main memory 1125 also may be used for storing temporary variables or other intermediate information during execution of instructions by the processors 1115 through 1120.

A hard drive or other storage device 1130 may be used by the system 1100 for storing information and instructions. The storage device 1130 may include a magnetic disk or optical disc and its corresponding drive, flash memory or other nonvolatile memory, or other memory device. Such elements may be combined together or may be separate components. The system 1100 may include a read only memory (ROM) 1135 or other static storage device for storing static information and instructions for the processors 1115 through 1120.

A keyboard or other input device 1140 may be coupled to the bus 1110 for communicating information or command selections to the processors 1115 through 1120. The input device 1140 may include a keyboard, a keypad, a touch-screen and stylus, a voice-activated system, or other input device, or combinations of such devices. The computer may further include a mouse or other cursor control device 1145, which may be a mouse, a trackball, or cursor direction keys to communicate direction information and command selections to the processors and to control cursor movement on a display device. The system 1100 may include a computer display device 1150, such as a cathode ray tube (CRT), liquid crystal display (LCD), or other display technology, to display information to a user. In some environments, the display device may be a touch-screen that is also utilized as at least a part of an input device. In some environments, the computer display device 1150 may be or may include an auditory device, such as a speaker for providing auditory information.

A communication device 1150 may also be coupled to the bus 1110. The communication device 1150 may include a modem, a transceiver, a wireless modem, or other interface device. The system 1100 may be linked to a network or to other device using via an interface 1155, which may include links to the Internet, a local area network, or another environment. The system 1100 may comprise a server that connects to multiple devices. In one embodiment the system 1100 comprises a Java® compatible server that is connected to user devices and to external resources.

While the machine-readable medium 1130 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1100 and that causes the machine to perform any one or more of the methodologies of the present invention. The term "machine-readable medium" shall accordingly be taken to include, but not be limited to, solid-state memories, optical and magnetic media, and carrier wave signals.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD-ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Furthermore, it is appreciated that a lesser or more equipped computer system than the example described above may be desirable for certain implementations. Therefore, the configuration of system 1100 may vary from implementation to implementation depending upon numerous factors, such as price constraints, performance requirements, technological improvements, and/or other circumstances.

It is noted that processes taught by the discussion above can be practiced within various software environments such as, for example, object-oriented and non-object-oriented programming environments, Java based environments, such as a J2EE environment or environments defined by other releases of the Java standard), or other environments (e.g., a .NET environment, a Windows/NT environment each provided by Microsoft Corporation).

It should be noted that, while the embodiments described herein may be performed under the control of a programmed processor, such as processors 1115 through 1120, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A computer-implemented method comprising:
    identifying a web services configuration file; the web services configuration file comprising a plurality of runtime properties related to a web services configuration;
    identifying a web services client configuration file, the web services client configuration file comprising a plurality of runtime properties related to a web services client configuration;
    analyzing the runtime properties associated with the web services configuration file and the runtime properties associated with the web services client configuration file to identify a set of common runtime properties and a set of uncommon runtime properties; and
    generating a unified configuration file by unifying the web services configuration file and the web services client configuration file and removing the set of uncommon runtime properties from the unified configuration file.

2. The method of claim 1, further comprising deploying the unified configuration file at an application server.

3. The method of claim 1, wherein the unified configuration file is accessed using a plurality of tools, the plurality of tools including configuration tools to access the unified configuration file.

4. The method of claim 3, further comprising generating the configuration tools by unifying web services configuration tools and web services client configuration tools.

5. The method of claim 1, wherein:
    the plurality of runtime properties related to the web services configuration comprises a web services format; and
    the plurality of runtime properties related to a web services client configuration comprises a web services client format;
    the method further comprising creating a common format by unifying the web services format and the web services client format.

6. The method of claim 5, wherein creating the common format further comprises generating a format module to create the common format.

7. The method of claim 1, wherein:
    the plurality of runtime properties related to the web services configuration comprises a web services framework, and
    the plurality of runtime properties related to a web services client configuration comprises a web services client framework;
    the method further comprising creating a common framework by unifying the web services framework and the web services client framework.

8. The method of claim 7, wherein creating the common framework further comprises generating a framework module to create the common framework.

9. The method of claim 1, wherein creating the unified configuration file further comprises generating a mapping system to create the unified configuration file, the mapping system to provide direct mapping of one or more of a Web Service Description Language (WSDL) model, a WSDL interface mapping model, and a schema to Java mapping model to a configuration model.

10. A system comprising:
    a processor; and
    a memory coupled to the processor, the memory to store:
        a web services configuration file comprising a plurality of runtime properties related to a web services configuration, and
        a web services client configuration file comprising a plurality of runtime properties related to a web services client configuration, and
        instructions which when executed by the processor provide a mapping system to:
            analyze the runtime properties associated with the web services configuration file and the runtime properties associated with the web services client configuration file to identify a set of common runtime properties and a set of uncommon runtime properties,
            unify the web services configuration file and the web services client configuration file into a unified configuration file, and
            remove the set of uncommon runtime properties from the unified configuration file.

11. The system of claim 10, wherein the instructions further provide a format module to create a common format compatible with the web services configuration file and web services client configuration file.

12. The system of claim 10, wherein the memory further comprising storing a framework module to create a common framework compatible with the web services configuration file and web services client configuration file.

13. The system of claim 10; wherein the instructions further provide tools to provide access to the unified configuration file, wherein the tools are web services tools and web services client tools.

14. The system of claim 10; wherein the mapping system comprising one or more of: a mapping module and a unifying module.

15. The system of claim 10, wherein the web services configuration file, the web services client configuration file, and the unified configuration file reside at a web application server residing at a Java 2 Enterprise Edition (J2EE) engine.

16. A non-transitory machine-readable medium having stored thereon data representing sets of instructions which, when executed by a machine, cause the machine to:

identifying a web services configuration file, the web services configuration file comprising a plurality of runtime properties related to a web services configuration;

identifying a web services client configuration file, the web services client configuration file comprising a plurality of runtime properties related to a web services client configuration;

analyzing the runtime properties associated with the web services configuration file and the runtime properties associated with the web services client configuration file to identify a set of common runtime properties and a set of uncommon runtime properties; and generating a unified configuration file by unifying the web services configuration file and the web services client configuration file and removing the set of uncommon runtime properties from the unified configuration file.

17. The machine-readable medium of claim 16, wherein
the plurality of runtime properties related to the web services configuration comprises a web services format, and
the plurality of runtime properties related to a web services client configuration comprises a web services client format; and
wherein the sets of instructions which; when executed by the machine, further cause the machine to create a common format by unifying the web services format and web services client format.

18. The machine-readable medium of claim 17, wherein the sets of instructions which, when executed by the machine, further cause the machine to generate a format module to create the common format.

19. The machine-readable medium of claim 17, wherein
the plurality of runtime properties related to the web services configuration comprises a web services framework, and
the plurality of runtime properties related to a web services client configuration comprises a web services client framework; and
wherein the sets of instructions which, when executed by the machine, further cause the machine to create a common framework by unifying the web services framework and web services client framework.

20. The machine-readable medium of claim 19, wherein the sets of instructions which, when executed by the machine, further cause the machine to generate a framework module to create the common framework.

* * * * *